United States Patent
Esliger et al.

(10) Patent No.: US 6,700,927 B1
(45) Date of Patent: Mar. 2, 2004

(54) METHOD FOR ESTABLISHING AND ADAPTING COMMUNICATION LINK PARAMETERS IN XDSL TRANSMISSION SYSTEMS

(75) Inventors: Jamie Esliger, Kanata (CA); Sabit Say, Jersey City, NJ (US)

(73) Assignee: Next Level Communications, Inc., Rohnert Park, CA (US)

( * ) Notice: Subject to any disclaimer, the term of this patent is extended or adjusted under 35 U.S.C. 154(b) by 0 days.

(21) Appl. No.: 09/521,914

(22) Filed: Mar. 9, 2000

Related U.S. Application Data (60) Provisional application No. 60/123,716, filed on Mar. 10, 1999.

(51) Int. Cl.[7] .............................. H04B 1/38; H04L 5/16
(52) U.S. Cl. ...................................... 375/222; 375/219
(58) Field of Search ................................. 375/219, 220, 375/222, 225

(56) References Cited

U.S. PATENT DOCUMENTS

| | | | |
|---|---|---|---|
| 5,469,495 A | 11/1995 | Beveridge | 379/56 |
| 5,809,033 A | 9/1998 | Turner et al. | 370/522 |
| 5,999,563 A | 12/1999 | Polley et al. | 375/222 |
| 6,167,034 A * | 12/2000 | Langberg et al. | 370/281 |
| 6,310,909 B1 * | 10/2001 | Jones | 375/220 |
| 6,389,065 B1 * | 5/2002 | McGhee | 375/222 |

* cited by examiner

Primary Examiner—Phoung Phu
(74) Attorney, Agent, or Firm—Covington & Burling (57) ABSTRACT

A method is disclosed for establishing and adapting communication link parameters in xDSL transmission systems. The method determines a frequency allocation scheme that makes the delivery of both xDSL services and traditional telecommunications services possible, and uses information about service bit-rate requirements and the deployment characteristics of a given local loop to select an optimal combination of symbol rate and transmission modulation density that is capable of delivering desired xDSL services. The method includes the steps of establishing communication between xDSL termination units, and determining a maximum transmission modulation density that can be used for a plurality of predetermined symbol rates. One method of performing these steps is a symbol rate stepping method in which communication is initiated at a fraction of the final symbol rate, and the symbol rate is iteratively stepped up until the final symbol rate is reached.

5 Claims, 6 Drawing Sheets

| MODULATION DENSITY | MINIMUM SIGNAL-TO-NOISE RATIO (dB) |
|---|---|
| QPSK | 16 |
| 16 QAM | 19 |
| 32 QAM | 22 |
| 64 QAM | 25 |
| 128 QAM | 28 |
| 256 QAM | 31 |

*FIG. 4A*

| SYMBOL RATE (MBAUD) | SIGNAL-TO-NOISE RATIO (dB) | MAXIMUM MODULATION DENSITY | MAXIMUM ACHIEVABLE BIT RATE (Mb/s) |
|---|---|---|---|
| 4.86 | 23 | 32 QAM | 24.3 |
| 5.184 | 22 | 32 QAM | 25.92 |
| 6.48 | 21 | 16 QAM | 25.92 |

METHOD FOR ESTABLISHING AND ADAPTING COMMUNICATION LINK PARAMETERS IN XDSL TRANSMISSION SYSTEMS

CROSS-REFERENCE

This application claims the benefit of U.S. Provisional Application No. 60/123,716, filed Mar. 10, 1999.

FIELD OF THE INVENTION

The present invention relates to methods for establishing and adapting communication link parameters, including symbol rate and transmission modulation density, in xDSL transmission systems.

BACKGROUND OF THE INVENTION

Basic telecommunications services such as analog telephony, or Plain Old Telephony Service (POTS), currently serve as a main source of revenue for local exchange carriers and other telephone companies. However, there is a growing demand for high speed data services, such as digital video and high speed Internet access. Although there has been relatively little deployment of high speed data services to date, local exchange carriers and other telecommunications service providers are working to find cost-effective ways of meeting the growing demand for those services.

The part of the telecommunications network that connects a telephone central office to subscriber premises is known as the local loop. Local loops are still largely comprised of twisted wire pair links. Such links, which were originally installed to provide narrowband POTS, usually employ copper wire as the electrical transmission medium. Some twisted wire pair links have either been upgraded or replaced by the installation of fiber optic links, but the majority of local loop twisted wire pair links have been in place for many years.

Telecommunications service providers are currently exploring a number of technologies for providing high speed data services, including wireless technology, Hybrid Fiber Coax (HFC), Fiber-To-The-Curb (FTTC), Fiber-To-The-Home (FTTH), Asymmetric Digital Subscriber Line (ADSL), Symmetric Digital Subscriber Line (SDSL), High-speed Digital Subscriber Line (HDSL), and Very-high-speed Digital Subscriber Line (VDSL) technology. Although many of these technologies are likely to play some role in service providers' long-term business strategies, many providers are seeking to meet the growing demand for high speed data services by using switched wireline infrastructures based on Fiber-To-The-Neighborhood (FTTN) and xDSL. In an FTTN local loop, optical fiber connects the central office to a cross-connection device, and the last portion of the local loop—from the cross-connection device to the subscriber premise—is comprised of a twisted wire pair link. The last portion of the local loop can also be comprised of other types of transmission facilities, as known to those of skill in the art.

As used in this specification, the term "xDSL" refers to ADSL, SDSL, HDSL, VDSL, and other digital subscriber line technologies known to those of skill in the art. xDSL technology enables telephone companies to provide high speed data services over local loops comprised in whole or in part of twisted wire pair links (or other transmission facilities), as in FTTN networks.

In a typical xDSL installation, the transmission facility that connects a subscriber residence to the rest of the telecommunications network is terminated by a subscriber-side xDSL termination unit (SS-XTU) on the subscriber side, and a line-side xDSL termination unit (LS-XTU) on the line or central office side. The LS-XTU receives signals from the upstream portion of the telecommunications network, and converts the signals from the format employed by the telecommunications network into xDSL format. The SS-XTU receives the xDSL-modulated signals, demodulates them, and passes them on to various telecommunications devices at the subscriber residence. The SS-XTU also transmits information in the upstream direction, where it is received by the LS-XTU, reformatted, and passed on to the telecommunications network.

In digital communication systems, the signal being transmitted is generally distorted by channel impairments, which results in intersymbol interference (ISI). A general means to reduce the error rates resulting from ISI is to use an equalizer. Thus, in most embodiments involving digital communication, the SS-XTU and the LS-XTU contain an equalizer designed to compensate for or reduce ISI.

One method of equalization is based on the use of previously detected symbols to suppress ISI in the present symbol being detected. An equalizer that implements such a method is called a decision feedback equalizer (DFE).

DFEs contain both feedback and feed-forward filters. The filter coefficients are commonly adjusted according to the mean-square error (MSE) criterion, which seeks to minimize the mean-square value of the error between the information symbol being transmitted and the estimate of that symbol at the output of the equalizer. The basic idea is to move the set of equalizer coefficients closer to the optimum set corresponding to the minimum MSE. Other criteria such as peak distortion can be used to optimize filter coefficients. Such criteria, as well as other types of equalizers and equalization methods, are known to those of skill in the art.

A typical approach in establishing communication between a LS-XTU and a SS-XTU is to transmit a signal from the LS-XTU to the SS-XTU at a predetermined symbol rate, and to attempt to determine a solution—i.e., to converge the equalizer coefficients on an optimum solution—for the transmitted signal. However, if the symbol rate is high—as it needs to be for xDSL transmission—such "blind" acquisition may cause the equalizer solution in the SS-XTU to diverge, especially if the transmission facility between the LS-XTU and SS-XTU contains bridged taps. In those situations, communication may not be established between the LS-XTU and SS-XTU, or, if established, the communication may be poor. Consequently, there is a need for an improved method of establishing communication between xDSL line-side and subscriber-side termination units.

Before a telecommunications company can provide xDSL-based high speed data services to a subscriber, it needs to select a symbol rate and modulation density to use for communication between xDSL termination units.

Telecommunications companies are likely to provide various high speed data services, such as digital video, Internet access, ethernet service, and telephone service, which differ in terms of bandwidth requirements. The territories of telecommunication companies (or service areas within a single territory) may also differ in terms of the length and quality of the transmission facilities between the line-side and subscriber-side termination units. Individual local loops are thus likely to differ in terms of their signal-to-noise ratios and bit error rates. As a result, no single combination of a particular symbol rate and a particular transmission modulation density is likely to be optimal for all high speed data services and deployment scenarios. Consequently, there is a need for an efficient method to determine a symbol rate and modulation density combination that is capable of supporting a bit rate sufficient to provide desired high speed data services on individual local loops.

In addition, telecommunications companies need to maintain their ability to provide basic telecommunications services, such as POTS, Integrated Services Digital Network (ISDN), and Universal Digital Channel (UDC) service, which constitute primary sources of revenue, over the same facilities used to provide newer xDSL-based services. Consequently, a method for determining how to provide xDSL service should also specify parameters, such as an upstream and a downstream frequency range, that avoid or at least reduce the risk of interference with basic telecommunications services that are being provided either on the same link or on adjacent links.

SUMMARY OF THE INVENTION

The present invention provides a method for establishing and adapting communication link parameters in xDSL transmission systems. The overall method includes the steps of establishing communication between xDSL termination units, and determining a maximum transmission modulation density that can be used for each of a plurality of predetermined symbol rates. The invention provides additional, specific methods for performing those two steps: a symbol rate stepping method for establishing communication between xDSL termination units, and a rate training method for determining a maximum transmission modulation density that can be used for each of a plurality of predetermined symbol rates.

In a preferred embodiment of the present invention, the symbol rate stepping method and the rate training method are used in the context of the overall method for establishing and adapting communication link parameters in xDSL transmission systems. In alternative embodiments, the symbol rate stepping method and the rate training method can be used independently.

The symbol rate stepping method is directed to an improved method of establishing communication between xDSL termination units at a given symbol rate. Rather than transmitting a signal at the final, desired symbol rate, and attempting to determine an equalizer solution "blindly" on that signal at the receiving termination unit, the present invention transmits a signal at a lower initial symbol rate, and iteratively steps up that rate by a symbol rate increment until the final, desired symbol rate is reached.

Within each iteration, after the receiving xDSL termination unit acquires a signal at a particular symbol rate, the equalizer solution that is determined for the signal at that symbol rate is held and used as the starting point for determining an equalizer solution for the signal at the next, increased symbol rate. By using this approach, the present invention reduces the risk of equalizer divergence, especially in the presence of bridged taps, and thereby provides a more efficient method of establishing communication between xDSL transmission and reception units.

More specifically, in a digital subscriber loop system comprised of a LS-XTU and a SS-XTU connected via a transmission facility, wherein the SS-XTU is comprised of an equalizer, the symbol rate stepping method of the present invention, which is directed to establishing communication between the LS-XTU and the SS-XTU at a desired symbol rate, comprises the steps of (a) setting an initial symbol rate equal to a first fraction of the desired symbol rate; (b) setting a symbol rate increment equal to a second fraction of the desired symbol rate; (c) initially setting a variable communication symbol rate equal to the initial symbol rate; (d) transmitting a signal from the LS-XTU to the SS-XTU at the variable communication symbol rate; (e) acquiring the signal transmitted at the variable communication symbol rate at the SS-XTU by determining a tentative equalizer solution for the signal transmitted at the variable communication symbol rate; (f) increasing the variable communication symbol rate by the symbol rate increment; (g) transmitting a signal from the LS-XTU to the SS-XTU at the variable communication symbol rate; (h) acquiring the signal transmitted at the variable communication symbol rate at the SS-XTU by using the previously determined tentative equalizer solution to determine a new tentative equalizer solution for the signal transmitted at the variable communication symbol rate; and (i) repeating steps (f)–(h) until the variable communication symbol rate is equal to the desired symbol rate.

The invention contemplates that the symbol rate stepping method can be used to establish communication between the LS-XTU and the SS-XTU in either the upstream direction, the downstream direction, or both.

The rate training method of the present invention is directed to determining, at each of a number of predetermined symbol rates, a maximum modulation density that can be used for communication between xDSL termination units. The maximum modulation density that is determined for each symbol rate can[]then be used to compute a maximum bit rate achievable at each symbol rate. That information—the maximum modulation density and the maximum bit rate achievable at each symbol rate—can then be used to select an optimal combination of symbol rate and transmission modulation density capable of delivering a set of desired high speed data services over a particular local loop, as described below in the method for establishing and adapting link parameters.

The first step in the rate training method is to establish communication at a predetermined symbol rate between the xDSL transmission and reception units. This step can be accomplished using the symbol rate stepping method described previously. In a preferred embodiment, the signal-to-noise ratio at that predetermined symbol rate is then measured and used to determine the maximum transmission modulation density that can be used at the predetermined symbol rate. The maximum transmission modulation density and the predetermined symbol rate can then be used to compute the maximum bit rate achievable for the predetermined symbol rate. It is also possible to determine the maximum transmission modulation density and the maximum achievable bit rate for a number of predetermined symbol rates.

The rate training method can be executed upon the occurrence of a number of events, such as when the telecommunications system comprising the xDSL transmission and reception units is initialized, when the telecommunications system software is upgraded, or when xDSL transmission and reception units are power cycled. In that way, the maximum transmission modulation density and bit rate achievable for each predetermined symbol rate—and ultimately the optimal combination of symbol rate and transmission modulation density capable of delivering a desired set of high speed data services over a given local loop—can be determined every time a specified event occurs. The execution of the rate training method upon the occurrence of a particular event potentially results in the selection of a different optimal symbol rate and transmission modulation density every time such an event occurs.

More specifically, in a digital subscriber loop system comprised of a LS-XTU and a SS-XTU connected via a transmission facility, the rate training method of the present invention, which is directed to determining a maximum transmission modulation density achievable for communicating between the LS-XTU and the SS-XTU at a selected symbol rate, comprises the steps of establishing communication between the LS-XTU and the SS-XTU using the selected symbol rate and an initial transmission modulation density; measuring a signal-to-noise ratio from the LS-XTU to the SS-XTU; and, responsive to the signal-to-noise ratio measurement, determining a maximum transmission modulation density for use between the LS-XTU and the SS-XTU at the selected symbol rate.

In addition, a maximum bit rate achievable between the LS-XTU and the SS-XTU can be computed for the selected symbol rate, responsive to the maximum transmission modulation density.

The invention contemplates that the rate training method can be used to determine a maximum transmission modulation density and a maximum bit rate achievable for communicating between the LS-XTU and the SS-XTU for a plurality of selected symbol rates, and in either the upstream direction, the downstream direction, or both.

The method for establishing and adapting link parameters of the present invention enables xDSL transmission and reception units to establish and adapt link parameters in a way that makes the delivery of both traditional telecommunications services and high speed data services possible.

The first step in the method for establishing and adapting link parameters is to select a downstream (LS-XTU to SS-XTU) spectral allocation scheme and an upstream (SS-XTU to LS-XTU) spectral allocation scheme. This may be accomplished by placing the upstream xDSL frequency range above the frequencies used by other telecommunications services on the link, and the downstream xDSL frequency range above the upstream xDSL frequency range. In addition, the upstream and downstream xDSL frequency ranges may be placed so as to minimize overlap with the frequency ranges of other telecommunication services being utilized on adjacent links.

In a preferred embodiment, the next step in the method for establishing and adapting link parameters is to determine the maximum transmission modulation density and corresponding maximum bit rate achievable for each of a plurality of preselected symbol rates. This step may be performed by using the rate training method described previously.

Finally, in a preferred embodiment, an optimal symbol rate and transmission modulation density are selected, based on the maximum transmission modulation density and maximum achievable bit rate for each preselected symbol rate. The selection of an optimal symbol rate and transmission modulation density may be based on a number of factors, including the bit rate necessary to deliver a desired set of high speed data services, and various characteristics of the deployment environment of the local loop, such as the frequencies at which impulse noise and RF ingress are likely to occur. The deployment characteristics of local loops are likely to vary by location and can be determined empirically. Because of the variance in service bit-rate requirements and deployment parameters, the optimal transmission modulation density chosen for the optimal symbol rate may be less than the maximum transmission modulation density capable of being used at the optimal symbol rate.

More specifically, in a subscriber loop system comprised of a LS-XTU and a SS-XTU connected via a transmission facility, the method for establishing and adapting communication parameters between the LS-XTU and the SS-XTU comprises the steps of (a) determining a spectral allocation scheme by selecting an upstream frequency range for communication from the SS-XTU to the LS-XTU having a lower limit greater than the upper limit of frequency ranges utilized by pre-designated telecommunications services on the transmission facility, and selecting a downstream frequency range for communication from the LS-XTU to the SS-XTU having a lower limit greater than the upper limit of the upstream frequency range; (b) for a each of a plurality of preselected downstream symbol rates within the downstream frequency range, determining a maximum transmission modulation density and a corresponding maximum bit rate achievable; (c) responsive to the maximum transmission modulation density and the corresponding maximum bit rate achievable for each of the plurality of preselected downstream symbol rates, selecting a downstream symbol rate from the preselected downstream symbol rates; and (d) selecting a downstream transmission modulation density for use with the selected downstream symbol rate that is less than or equal to the maximum transmission modulation density for the selected downstream symbol rate.

In addition, the method for establishing and adapting link parameters may be further comprised of the steps of retrieving a set of deployment parameters for the transmission facility, as well as a service bit rate requirement for the transmission facility; and selecting a symbol rate and transmission modulation density in response to the set of deployment parameters and the service bit rate requirement. The method for establishing and adapting link parameters also contemplates determining an optimum symbol rate and transmission modulation density capable of achieving the bit rate requirement while satisfying the set of deployment parameters, and selecting the optimum symbol rate and transmission modulation density as the symbol rate and transmission modulation density to use between a LS-XTU and a SS-XTU.

The invention contemplates that the method for establishing and adapting link parameters can be used to set and adapt communication parameters between a LS-XTU and a SS-XTU in either the upstream direction, the downstream direction, or both.

Another aspect of the present invention is to enable the above methods to be used in a test set apparatus. The test set apparatus is used to simulate an xDSL termination unit at a subscriber premise and to verify the line performance of a given twisted wire pair link or other transmission facility without the need to enter a subscriber's premises or to modify an actual xDSL termination unit.

It is an object of the present invention to enable the provision of xDSL-based high speed data services over local loops comprised of twisted wire pair links or other transmission facilities.

It is a further object of the invention to provide an improved method for establishing communication between xDSL line-side and subscriber-side termination units.

It is a further object of the invention to provide a method for establishing communication between xDSL line-side and subscriber-side termination units that reduces the likelihood of equalizer divergence.

It is a further object of the invention to provide a method for determining a maximum transmission modulation density that can be used at a given symbol rate for communication between xDSL line-side and subscriber-side termination units.

It is a further object of the invention to provide a method for determining an optimal combination of a symbol rate and transmission modulation density that is capable of supporting a bit rate sufficient to deliver high speed data services over individual local loops.

It is a further object of the invention to provide a method for determining communication parameters for the provision of xDSL-based high speed data services over twisted wire pair links or other transmission facilities that avoids or at least reduces the risk of interference with basic telecommunications services such as POTS over the same links.

It is a further object of the invention to provide a test set apparatus for verifying the line performance of a given twisted wire pair link or other transmission facility without the need to enter subscriber premises or to modify an actual xDSL termination unit.

The foregoing and other features, aspects, and advantages of the present invention will become more apparent from the following detailed description, which should be read in conjunction with the accompanying drawings.

BRIEF DESCRIPTION OF THE DRAWINGS

The accompanying drawings, which are incorporated into and form a part of the specification, illustrate the embodiments of the present invention and, together with the description, serve to explain the principles of the invention.

In the drawings.

DETAILED DESCRIPTION OF THE PREFERRED EMBODIMENTS

The present invention will now be described with reference to the accompanying drawings, which are provided as illustrative examples of preferred embodiments of the present invention. In describing the preferred embodiments illustrated in the drawings, specific terminology is used for the sake of clarity. However, the invention is not intended to be limited to the specific terms that are selected. Rather, each specific term is intended to include all equivalents that operate in a similar or substantially similar manner to accomplish a similar or substantially similar result.

With reference to the drawings in general, and FIGS. 1 through 6 in particular, the methods of the present invention are disclosed.

Figure 1:
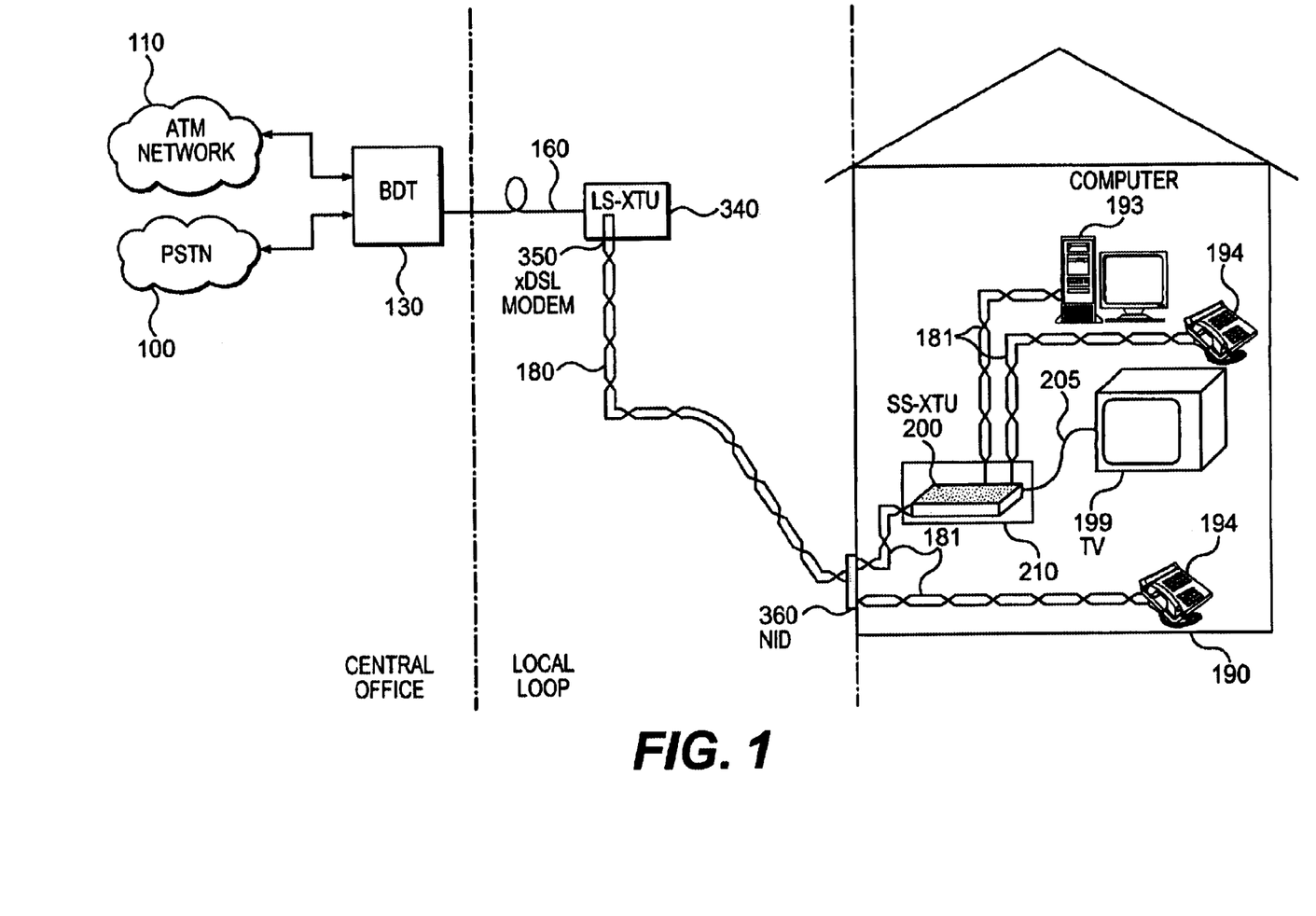
FIG. 1 illustrates a Fiber-To-The-Neighborhood network in which the last portion of the local loop is comprised of a twisted wire pair link.

FIG. 1 illustrates a telecommunications local loop configuration in which the methods of the present invention may be utilized. The local loop depicted in FIG. 1 connects various devices in the residence 190, such as computer 193, telephone 194, and television (TV) 199, to the Public Switched Telecommunications Network (PSTN) 100. The local loop may also connect the devices in the residence 190 to an Asynchronous Transfer Mode (ATM) network 110, or to other private or non-switched public networks. The connection of the local loop to PSTN 100, ATM network 110, or other private or non-switched public networks occurs at a Broadband Digital Terminal (BDT) 130 at the central office.

LS-XTU 340 is connected to BDT 130 via optical fiber 160. In the configuration shown in FIG. 1, LS-XTU 340 is located within the local loop. In an alternative configuration, LS-XTU 340 is located within the telephone company central office. In the system depicted in FIG. 1, digital signals in a format that is similar to the Synchronous Digital Hierarchy (SDH) format may be transmitted to and from each LS-XTU 340 over optical fiber 160 at a rate of 155 Mb/s. Optical fiber 160 may be a single-mode fiber and a dual wavelength transmission scheme may be used to communicate between LS-XTU 340 and BDT 130. A single wavelength scheme may alternatively be used, in which low reflectivity components are used to permit transmission and reception on one fiber.

As depicted in FIG. 1, LS-XTU 340 is comprised of an xDSL modem 350, which provides for the transmission of high speed data over twisted wire pair drop cable 180 to and from residence 190. In another configuration (not shown), the drop cable can comprise another type of transmission facility, as known to those of skill in the art. As mentioned previously, the term "xDSL" refers to twisted wire pair digital subscriber loop transmission techniques, such as Asymmetric Digital Subscriber Line (ADSL), Symmetric Digital Subscriber Line (SDSL), High-speed Digital Subscriber Line (HDSL), Very-high-speed Digital Subscriber Line (VDSL), or other similar digital transmission techniques, as known to those skilled in the art.

In the configuration depicted in FIG. 1, LS-XTU 340 receives signals from the upstream portion of the telecommunications network over optical fiber 160, converts those signals into xDSL format, and uses xDSL modem 350 to transmit the converted signals to the residence 190 via twisted wire pair drop cable 180.

In the system shown in FIG. 1, a Network Interface Device (NID) 360 is located on the side of the residence 190, at what is known in the industry as the network demarcation point. At a minimum, NID 360 provides lightning protection, as well as the ability to troubleshoot the network by allowing connection of a telephone or other test apparatus to the twisted wire pair drop cable 180 to determine if wiring problems exist on inside twisted wire pairs 181 or on inside coaxial cable 205. In an alternative configuration in which narrowband telephony signals are combined with the signals transmitted by xDSL modem 350 over twisted wire pair drop cable 180, NID 360 is also used to separate the narrowband telephony signals from the xDSL signals. In such a configuration, a telephone 194 is connected directly to NID 360 by inside twisted wire pair 181.

In the system shown in FIG. 1, the signals received at NID 360 are sent to SS-XTU 200 over inside twisted wire pair 181. In an alternative configuration (not shown), the signals received at NID 360 are sent to SS-XTU 200 over inside coaxial cable. In the system shown in FIG. 1, SS-XTU 200 forms part of a gateway 210, which serves as an interface to various devices in the residence 190, such as computer 193, telephone 194, and TV 199. Devices in residence 190 may be connected to gateway 210 by inside twisted wire pairs 181, inside coaxial cable 205, or other connections known to those of skill in the art. For example, TV 199 may be connected to gateway 210 by an RCA or S-video connection.

Although FIG. 1 illustrates SS-XTU 200 located inside the living area of residence 190, SS-XTU 200 can be located in the basement, in the garage, in a wiring closet, in the attic, or in other spaces within residence 190. SS-XTU 200 an also be located outside residence 190, in which case it may require a hardened enclosure and components that work over a larger range of temperatures and other environmental conditions than those used in termination units located inside subscriber residences. Techniques for developing hardened enclosures and selecting environment-tolerant components are known to those of skill in the art.

LS-XTU 340 and SS-XTU 200 include modems, and work in conjunction with each other to provide a path for the transmission of xDSL signals. The xDSL signals may contain, among other things, Asynchronous Transfer Mode (ATM) cells, and may be combined with narrowband telephony signals. In the configuration depicted in FIG. 1, SS-XTU 200 receives xDSL-modulated signals from LS-XTU 340, demodulates them, deframes them, performs error-checking and correction on them, and produces ATM cells as its output. In a preferred embodiment, SS-XTU 200 and LS-XTU 340 also communicate in the upstream direction, in which case SS-XTU 200 transmits xDSL-modulated signals to LS-XTU 340 over twisted wire pair drop cable 180 (or other transmission facility); LS-XTU 340 receives such signals, reformats them, and passes them on to the telecommunications network via optical fiber 160.

Figure 2:
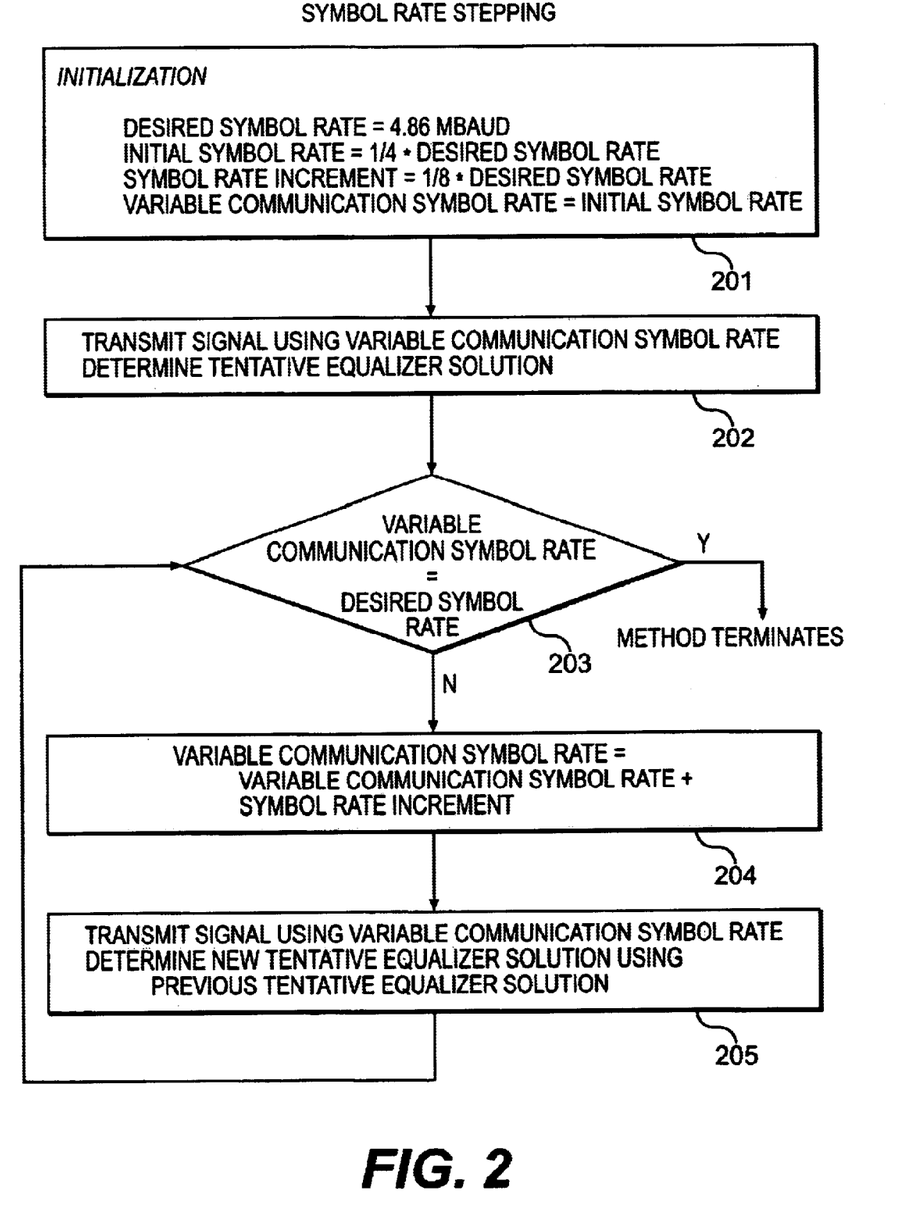
FIG. 2 provides a flow chart depicting a preferred embodiment of the symbol rate stepping method of the present invention.

FIG. 2 provides a flow chart depicting a preferred embodiment of the symbol rate stepping method of the present invention. In the embodiment depicted in FIG. 2, the goal is to establish downstream communication between LS-XTU 340 and SS-XTU 200 at a desired symbol rate—in this example, approximately 4.86 Mbaud. Other desired symbol rates may be selected, as would be apparent to those of skill in the art.

In the embodiment depicted in FIG. 2, rather than initially transmitting a signal at the desired symbol rate of approximately 4.86 Mbaud, LS-XTU 340 begins with an initial symbol rate of ¼ of the desired symbol rate, or approximately 1.215 Mbaud. This is shown in Step 201, the initialization step, where the initial symbol rate is set to ¼ of the desired symbol rate, or approximately 1.215 Mbaud. In addition, in Step 201, the symbol rate increment is set to ⅛ of the desired symbol rate, or approximately 0.608 Mbaud; the variable communication symbol rate is set to the initial symbol rate; and the transmission modulation density is set to QPSK. Other initial symbol rates, symbol rate increments, and transmission modulation densities may be utilized, as apparent to those of skill in the art.

In Step 202 of the preferred embodiment depicted in FIG. 2, a signal is transmitted from LS-XTU 340 to SS-XTU 200 at the variable communication symbol rate. The transmitted signal is acquired at the equalizer at SS-XTU 200 by determining a tentative equalizer solution (i.e., a set of filter coefficients) for the variable communication symbol rate. Once the transmitted signal is acquired at SS-XTU 200, the tentative equalizer solution is held for use in acquiring the signal to be transmitted at the next symbol rate, as discussed below.

In Step 203, a check is performed to see if downstream communication has been established at the desired symbol rate (in this embodiment, approximately 4.86 Mbaud). If it has, the symbol rate stepping method terminates. If downstream communication has not yet been established at the desired symbol rate, the method proceeds to Step 204, where the variable communication symbol rate is increased by the symbol rate increment (in this embodiment, approximately 0.608 Mbaud), yielding a new variable communication symbol rate.

A signal is then transmitted from LS-XTU 340 to SS-XTU 200 at the new variable communication symbol rate, as shown in Step 205. At SS-XTU 200, the previously determined tentative equalizer solution is used as the initial solution for acquiring the signal transmitted at the new variable communication symbol rate. As before, once the transmitted signal is acquired at SS-XTU 200, the tentative equalizer solution is held for use in acquiring the next transmitted signal.

As shown in FIG. 2, Steps 203 through 205 are repeated iteratively until LS-XTU 340 and SS-XTU 200 communicate at the desired symbol rate. In a preferred embodiment, upstream communication is established between SS-XTU 200 and LS-XTU 340 to acknowledge the acquisition of the transmitted signal and to synchronize each iteration.

In an embodiment in which the desired symbol rate is approximately 4.86 Mbaud, the initial symbol rate is ¼ of the desired symbol rate, or approximately 1.215 Mbaud, and the symbol rate increment is ⅛ of the desired symbol rate, or approximately 0.608 Mbaud, the symbol rate stepping method of the present invention would proceed as follows. First, the variable communication symbol rate is set to the initial symbol rate, or approximately 1.215 Mbaud. A signal is then transmitted from LS-XTU 340 to SS-XTU 200 at approximately 1.215 Mbaud. At SS-XTU 200, a tentative equalizer solution is determined for the approximately 1.215 Mbaud signal. The variable communication symbol rate is then increased by the symbol rate increment, or approximately 0.608 Mbaud. The new variable communication symbol rate is thus 1.215+0.608, or approximately 1.823 Mbaud. A signal is then transmitted from LS-XTU 340 to SS-XTU 200 at the new variable communication symbol rate. At SS-XTU 200, the previously determined tentative equalizer solution is used to initiate the determination of a solution for the new signal at approximately 1.823 Mbaud.

The variable communication symbol rate is then increased by the symbol rate increment, or approximately 0.608 Mbaud. The new variable communication symbol rate is thus 1.823+0.608, or approximately 2.431 Mbaud. A signal is then transmitted from LS-XTU 340 to SS-XTU 200 at the new variable communication symbol rate. At SS-XTU 200, the previously determined tentative equalizer solution is used to initiate the determination of a solution for the new signal at approximately 2.431 Mbaud.

These steps of increasing the variable communication baud rate, and using the previously determined tentative equalizer solution to determine a solution for the signal being transmitted at the current variable communication baud rate, are repeated until the variable communication baud rate is equal to the final desired baud rate. In this example, in which the initial symbol rate is ¼ of the desired symbol rate, and the symbol rate increment is ⅛ of the desired symbol rate, the method of the present invention would thus proceed for 6 iterations to reach the desired symbol rate. After the final iteration, LS-XTU 340 and SS-XTU 200 would have established communication at the desired symbol rate of approximately 4.86 Mbaud.

In one embodiment, the symbol rate stepping method is used to establish communication in the downstream direction. In an alternative embodiment, the symbol rate stepping method of the present invention is also used to establish communication between SS-XTU 200 and LS-XTU 340 in the upstream direction.

Figure 3:
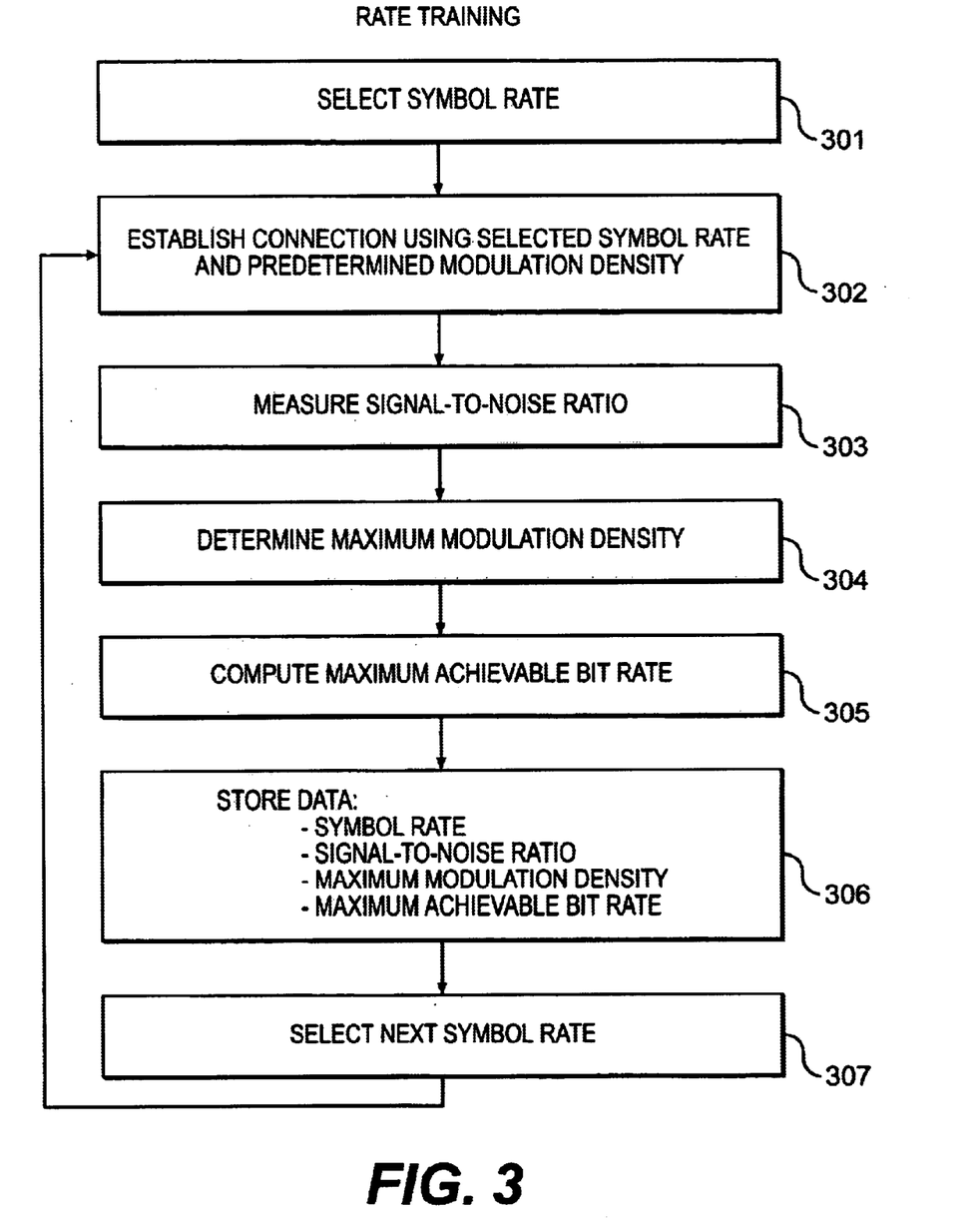
FIG. 3 provides a flow chart depicting a preferred embodiment of the rate training method of the present invention.

FIG. 3 provides a flow chart depicting a preferred embodiment of the rate training method of the present invention. A list of preselected symbol rates is maintained for use in the downstream direction. In a preferred embodiment, this list consists of four symbol rates: approximately 3.30 Mbaud, approximately 4.86 Mbaud, approximately 5.184 Mbaud, and approximately 6.48 Mbaud. Other symbol rates may be selected, as apparent to those of skill in the art. In Step 301, one of the preselected symbol rates is chosen.

In Step 302, communication is established between LS-XTU 340 and SS-XTU 200 using the chosen symbol rate and a predetermined transmission modulation density. In a preferred embodiment, the predetermined transmission modulation density is Quadrature Phase-Shift Keying (QPSK), and Step 302 is carried out by the symbol rate stepping method of the present invention, as discussed above. Other methods of establishing communication and other transmission modulation densities may be used, as apparent to those of skill in the art.

Figure 4A:
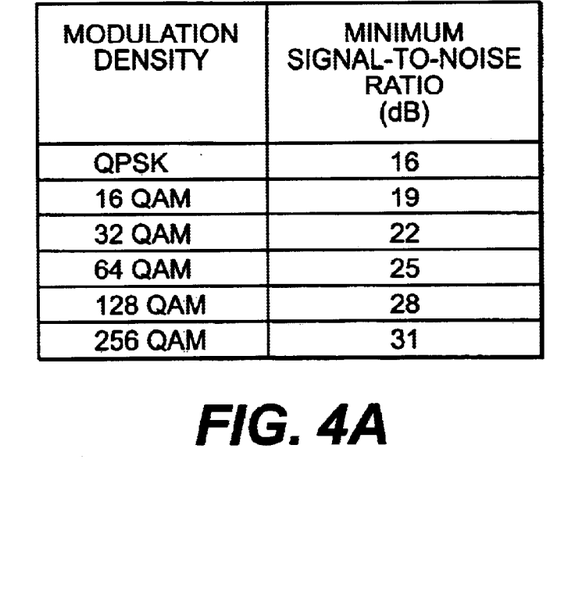
FIG. 4A provides a table illustrating an example of minimum signal-to-noise ratios required to use specific transmission modulation densities.
Figure 4B:
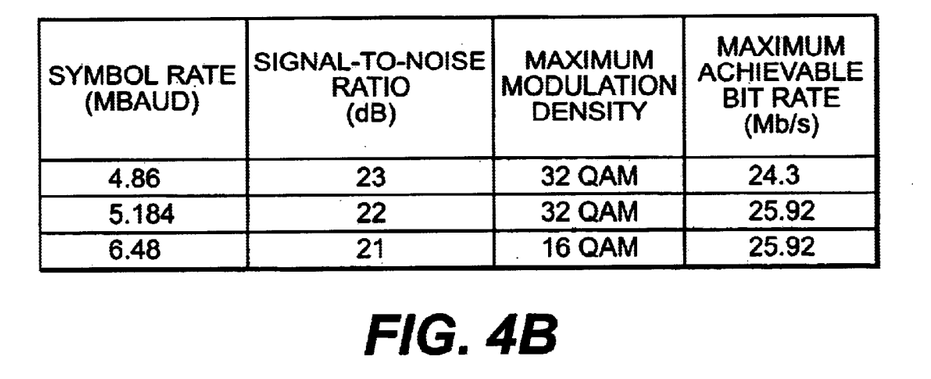
FIG. 4B provides a table illustrating an example of the data stored as a result of the execution of the rate training method of the present invention.

In Step 303, the signal-to-noise ratio is measured for the established connection. FIG. 4B illustrates an example in which the signal-to-noise ratio for the selected symbol rate of approximately 4.86 Mbaud is 23 dB.

In Step 304 in FIG. 3, the signal-to-noise ratio measurement is used to determine a maximum modulation density that can be used at the selected symbol rate. The determination of the maximum modulation density that can be used is based on a predetermined performance threshold. In other words, achieving a maximum acceptable bit error ratio (BER) at a given modulation density requires a minimum signal-to-noise ratio. FIG. 4A illustrates an example of minimum signal-to-noise ratios for specific modulation densities. For example, in the embodiment shown in FIG. 4A, a modulation density of 16-QAM (Quadrature Amplitude Modulation with a 16-point signal constellation) requires a signal-to-noise ratio of at least 19 dB for a BER no higher than approximately $10^{-7}$ (before error correction), or approximately $10^{-10}$ (after error correction). In an alternative embodiment in which it was determined that a higher BER could be tolerated for a particular configuration or application, a 16-QAM modulation density could be used at a lower signal-to-noise ratio. The determination of acceptable performance thresholds is known to those of skill in the art.

Returning to the example in FIG. 4B, the signal-to-noise ratio measured at the symbol rate of approximately 4.86 Mbaud is approximately 23 dB. According to the table in FIG. 4A, that corresponds to a maximum modulation density of 32-QAM. 32-QAM is thus recorded in the first row in the table in FIG. 4B as the maximum modulation density that can be used, in the example, with a symbol rate of 4.86 Mbaud.

Next, in the preferred embodiment shown in FIG. 3, the maximum achievable bit rate is computed, based on the selected symbol rate and the maximum modulation density, as depicted in Step 305 of FIG. 3. From the table in FIG. 4B, a 32-QAM maximum modulation density means that 5 bits can be transmitted per symbol, as known to those of skill in the art. Multiplying 5 bits/symbol times 4.86 million symbols/second (the selected symbol rate) results in a maximum achievable bit rate of approximately 24.3 Mb/s. These data are then stored for the selected symbol rate, as shown in Step 306 and in the first row of the table in FIG. 4B.

Finally, in Step 307, another preselected symbol rate is chosen, and Steps 302 through 306 are repeated for the new symbol rate.

The table in FIG. 4B shows an example of the information that is determined and stored in a system with three preselected symbol rates: 4.86 Mbaud, 5.184 Mbaud, and 6.48 Mbaud. Using an illustrative example of the method of the present invention, in which the measured signal-to-noise ratios are as shown in FIG. 4B, the maximum bit rate achievable for each of those symbol rates is approximately 24.3 Mb/s, 25.92 Mb/s, and 25.92 Mb/s, respectively. Other preselected symbol rates can be designated by those of skill in the art.

In one embodiment, the rate training method is used to determine the maximum bit rate achievable for a number of preselected symbol rates in the downstream direction. For each of the preselected symbol rates, the maximum transmission modulation density is chosen from the group consisting of QPSK, 8-QAM, 16-QAM, 32-QAM, 64-QAM, 128-QAM, and 256-QAM. Other transmission modulation densities known to those of skill in the art may be permitted.

In an alternative embodiment, the rate training method can also be used to determine the maximum transmission modulation densities and maximum achievable bit rates that can be used in the upstream direction. In one embodiment, the preselected symbol rates in the upstream direction are 350 kbaud and 540 kbaud. As with the downstream direction, the maximum upstream transmission density may be chosen from the group consisting of QPSK, 8-QAM, 16-QAM, 32-QAM, 64-QAM, 128-QAM, and 256-QAM. Other symbol rates and transmission modulation densities can be selected by those of skill in the art.

Figure 5:
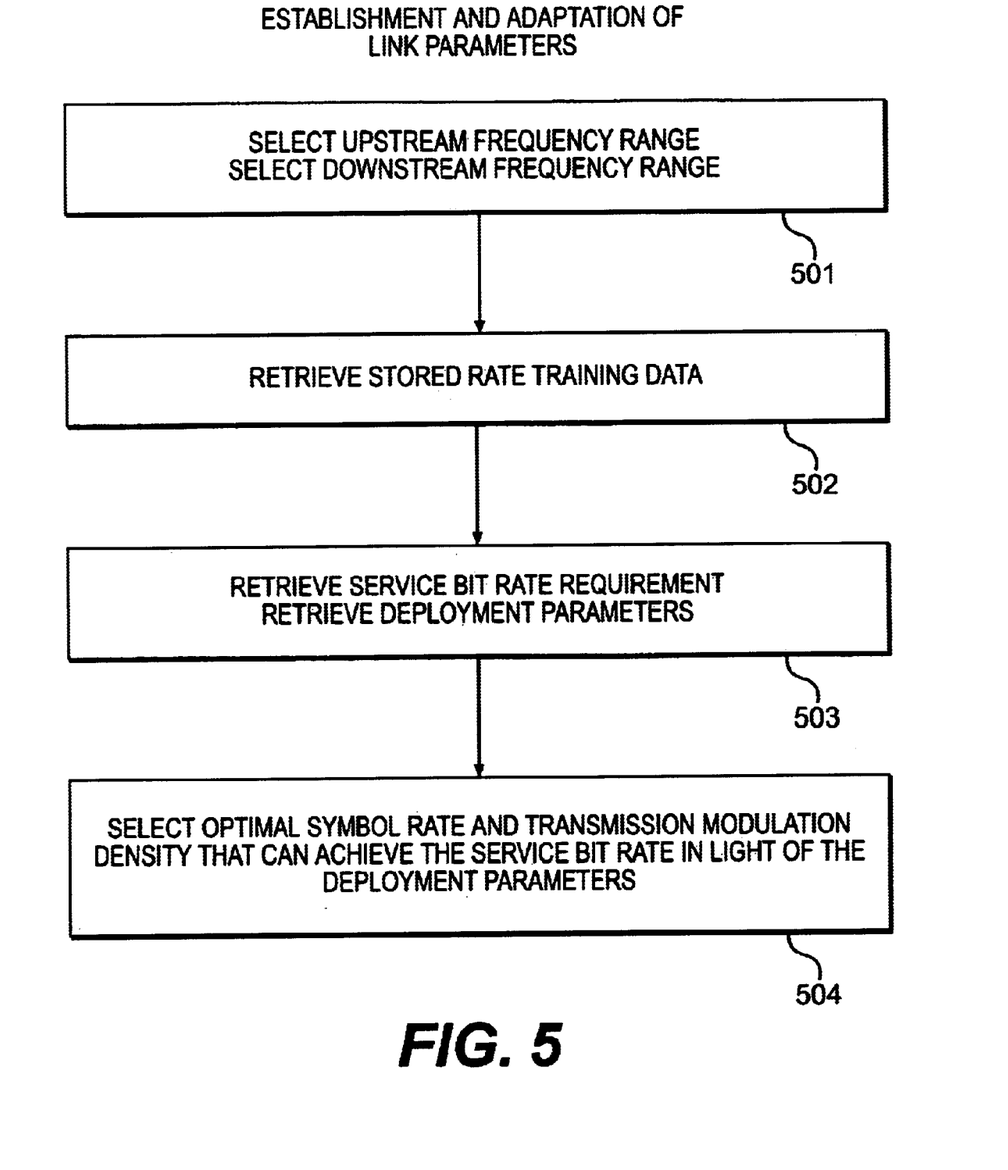
FIG. 5 provides a flow chart depicting a preferred embodiment of the method for establishing and adapting link parameters of the present invention.

FIG. 5 provides a flow chart depicting a preferred embodiment of the method for establishing and adapting link parameters of the present invention.

In Step 501, upstream and downstream frequency ranges are selected. In one embodiment, the lower limit of the upstream frequency range is set to 324 kHz, and the lower limit of the downstream frequency range is set to 1.5 MHz. In an alternative embodiment, the lower limit of the upstream frequency range is set to 570 kHz.

In a preferred embodiment, the method of the present invention avoids selecting frequencies for xDSL transmission that overlap with other telecommunications services possibly being used on the link, such as POTS, which typically has an upper frequency limit of 4 kHz, Integrated Services Digital Network Basic Rate Interface (ISDN BRI), which typically has an upper frequency limit of 250 kHz, and Universal Digital Channel (UDC), which has an upper frequency limit of 250 kHz. Preferred embodiments also minimize overlap with telecommunications services such as ADSL, SDSL, and HDSL, which typically have upper frequency limits from 500 kHz to 1.1 MHz, that are potentially being used on adjacent links. It will be apparent to those of skill in the art how to select different spectral allocation schemes based on the specific telecommunications services offered on the link at issue and on adjacent links.

In Step 502, the stored data that was determined as part of the rate training method is retrieved. An example of such data is the table shown in FIG. 4B. In a preferred embodiment, a predetermined downstream service bit-rate requirement and a set of predetermined deployment parameters are also retrieved, as shown in Step 503. In a preferred embodiment, the downstream service bit-rate requirement is 25.92 Mb/s. A bit-rate requirement can be determined by one of skill in the art based on the high speed data services to be delivered to customers on a particular link. 25.92 Mb/s is sufficient to deliver, for example, three MPEG-2 encoded digital video streams, as well as Internet data service.

In a preferred embodiment, the set of predetermined deployment parameters that is retrieved includes a signal-to-noise ratio (SNR) margin that is used to modify the minimum SNR required for each modulation density. For example, it might be determined that a particular deployment environment requires a SNR margin of 3 dB in order to achieve a certain performance threshold, such as a BER no higher than approximately $10^{-7}$ (before error correction), or approximately $10^{-10}$ (after error correction). In that case, the SNR margin of 3 dB would be added to the minimum SNR required for each modulation density. Thus, in the example shown in FIG. 4A, the minimum SNR required for QPSK modulation density would be 16+3, or 19 dB; the minimum SNR required for 16-QAM modulation density would be 19+3, or 22 dB; etc. Those of skill in the art can determine an appropriate SNR margin for each deployment environment.

Continuing with the example in which the downstream service bit-rate requirement is 25.92 Mb/s, only two of the three preselected symbol rates shown in FIG. 4B would be capable of achieving that bit-rate requirement: 5.184 Mbaud (using 32-QAM) and 6.48 Mbaud (using 16-QAM). In a high impulse noise environment, a lower symbol rate and a higher transmission modulation density typically provide more reliable service over longer distances than a higher symbol rate and a lower transmission modulation density. Consequently, if the deployment parameters in the example establish that the given local loop is located in a high impulse noise environment, the selection of an optimal symbol rate and transmission modulation density, shown in Step 504, would result in the selection of 5.184 Mbaud as the optimal symbol rate and 32-QAM as the optimal transmission modulation density (rather than 6.48 Mbaud and 16-QAM.)

Other deployment parameters and bit rate requirements might result in the selection of another symbol rate and transmission modulation density as optimal. For example, the deployment parameters might include the frequencies at which RF ingress is likely to occur, in which case the selection of an optimal symbol rate and modulation density combination would entail choosing a symbol rate and modulation density that avoid such frequencies. In an alternative embodiment, the symbol rate and transmission modulation density capable of achieving the highest bit rate could be selected. In yet another alternative embodiment, a symbol rate and transmission modulation density could be selected without reference to deployment parameters or to bit rate requirements. For example, the symbol rate and transmission modulation density combination that yields the highest signal-to-noise ratio margin could be selected.

In an alternative embodiment, a similar procedure could be used to select an upstream symbol rate and transmission modulation density.

Figure 6:
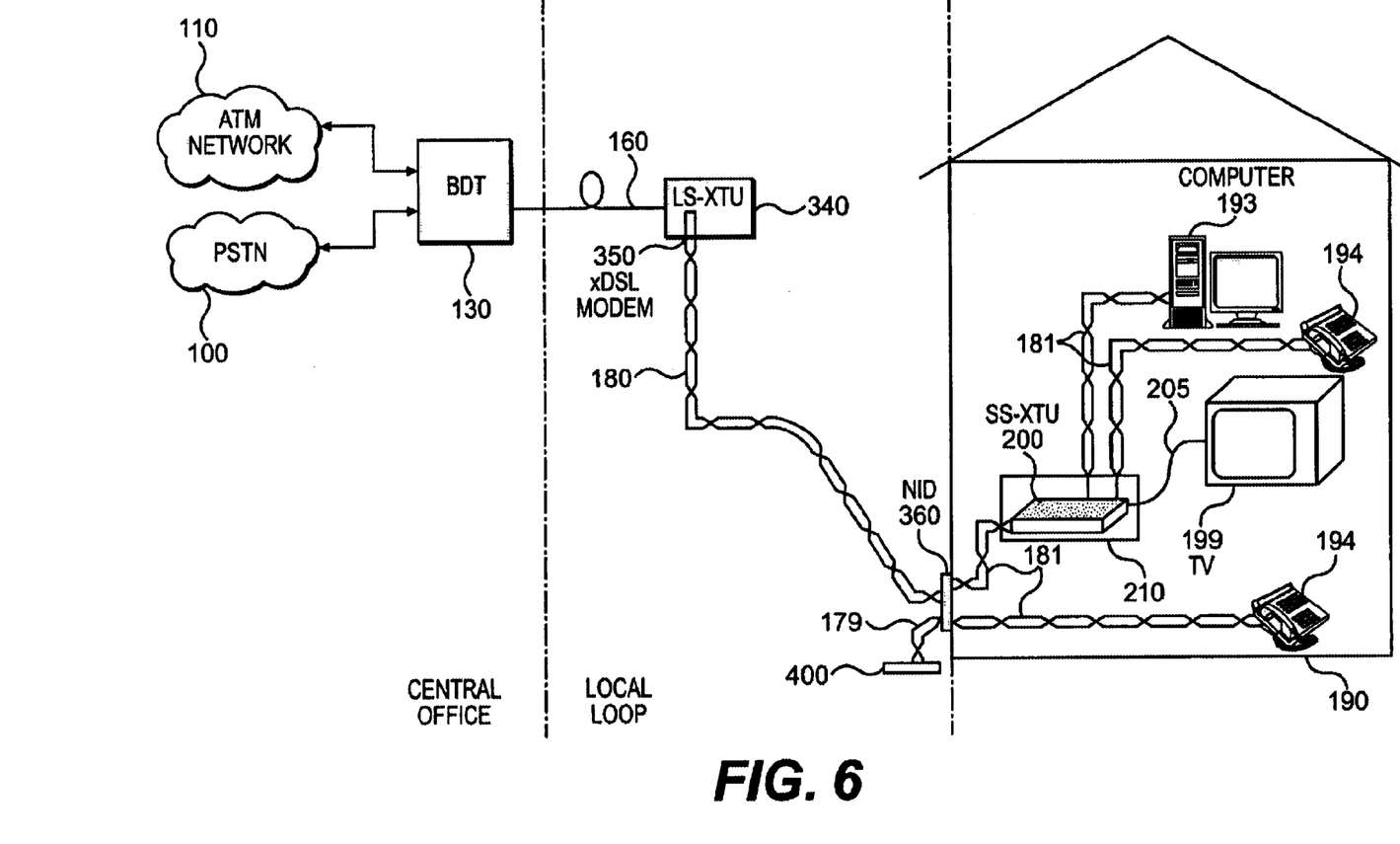
FIG. 6 illustrates a Fiber-To-The-Neighborhood network with a test set apparatus connected to the subscriber residence.

Finally, FIG. 6 depicts a test set apparatus 400 that implements the methods described in this invention and simulates SS-XTU 200. As shown in FIG. 6, test set apparatus 400 is connected to NID 360 by twisted wire pair link 179 outside subscriber residence 190, and can be used to verify the performance of the twisted wire pair link 180 by working in conjunction with LS-XTU 340 to execute the methods of the present invention, as described in this specification. In another configuration (not shown), test set apparatus 400 can be connected to NID 360 by another type of transmission facility, as known to those of skill in the art.

Although the invention has been particularly described by reference to specific embodiments, it should be readily apparent to those of ordinary skill in the art that various changes and modifications may be made in form and details without departing from the spirit and scope of the invention. The appended claims are intended to cover such changes and modifications, so as to afford broad protection to the invention and its equivalents.

What is claimed is:

1. In a digital subscriber loop system comprised of a line-side xDSL termination unit (LS-XTU) and a subscriber-side xDSL termination unit (SS-XTU) connected via a transmission facility, wherein the SS-XTU is comprised of an equalizer, a symbol rate stepping method of establishing communication between the LS-XTU and the SS-XTU at a desired symbol rate, comprising the steps of:
 a) setting an initial symbol rate equal to a first fraction of the desired symbol rate;
 b) setting a symbol rate increment equal to a second fraction of the desired symbol rate;
 c) initially setting a variable communication symbol rate equal to the initial symbol rate;
 d) transmitting a signal from the LS-XTU to the SS-XTU at the variable communication symbol rate;
 e) acquiring the signal transmitted at the variable communication symbol rate at the SS-XTU by determining a tentative equalizer solution for the signal transmitted at the variable communication symbol rate;
 f) increasing the variable communication symbol rate by the symbol rate increment;
 g) transmitting a signal from the LS-XTU to the SS-XTU at the variable communication symbol rate;
 h) acquiring the signal transmitted at the variable communication symbol rate at the SS-XTU by using the previously determined tentative equalizer solution to determine a new tentative equalizer solution for the signal transmitted at the variable communication symbol rate; and
 i) repeating steps (f)–(h) until the variable communication symbol rate is equal to the desired symbol rate.

2. In a digital subscriber loop system comprised of a line-side xDSL termination unit (LS-XTU) and a subscriber-side xDSL termination unit (SS-XTU) connected via a transmission facility, wherein the LS-XTU is comprised of an equalizer, a symbol rate stepping method of establishing communication between the SS-XTU and the LS-XTU at a desired symbol rate, comprising the steps of:
 a) setting an initial symbol rate equal to a first fraction of the desired symbol rate;
 b) setting a symbol rate increment equal to a second fraction of the desired symbol rate;
 c) initially setting a variable communication symbol rate equal to the initial symbol rate;
 d) transmitting a signal from the SS-XTU to the LS-XTU at the variable communication symbol rate;
 e) acquiring the signal transmitted at the variable communication symbol rate at the LS-XTU by determining a tentative equalizer solution for the signal transmitted at the variable communication symbol rate;
 f) increasing the variable communication symbol rate by the symbol rate increment;
 g) transmitting a signal from the SS-XTU to the LS-XTU at the variable communication symbol rate;
 h) acquiring the signal transmitted at the variable communication symbol rate at the LS-XTU by using the previously determined tentative equalizer solution to determine a new tentative equalizer solution for the signal transmitted at the variable communication symbol rate; and i) repeating steps (f)–(h) until the variable communication symbol rate is equal to the desired symbol rate.

3. The symbol rate stepping method of claim 1 or 2, wherein the initial symbol rate is set to ¼ of the desired symbol rate.

4. The symbol rate stepping method of claim 1 or 2, wherein the symbol rate increment is set to ⅛ of the desired symbol rate.

5. The method of claim 1 or 2, wherein the SS-XTU is an apparatus used to simulate an actual termination unit at a subscriber premises and to verify the line performance of the transmission facility.

* * * * *